United States Patent [19]

Le Noane et al.

[11] Patent Number: 5,706,380
[45] Date of Patent: Jan. 6, 1998

[54] APPARATUS AND A METHOD FOR IDENTIFYING AND SPLICING MULTICORE FIBERS

[75] Inventors: Georges Le Noane, Tregastel; Gabrielle Perrin, Ploubezre; René Le Marer, Tregastel, all of France

[73] Assignee: France Telecom, France

[21] Appl. No.: 674,675

[22] Filed: Jul. 2, 1996

[30] Foreign Application Priority Data

Jul. 4, 1995 [FR] France ............... 95 08042

[51] Int. Cl.⁶ ............................ G02B 6/255
[52] U.S. Cl. ............... 385/95; 385/71; 385/99; 385/147
[58] Field of Search .................. 385/95, 96, 97, 385/98, 99, 71, 147

[56] References Cited

U.S. PATENT DOCUMENTS

5,384,870  1/1995  Lieber ..................... 385/71 X

FOREIGN PATENT DOCUMENTS

A-0427 705  5/1991  European Pat. Off. .
A-2 236 198  1/1975  France .
A-2 701571  8/1994  France .

OTHER PUBLICATIONS

Patent Abstract of Japan: vol. 12 No. 276, p. 737, Jul. 30, 1988 Method for Aligning Multicore Optical Fiber.

Patent Abstract of Japan: vol. 7 No. 231, p. 229, Oct. 13, 1983 Manufacture of Multicored Optical Connector and Its Core.

*Primary Examiner*—Phan T. H. Palmer
*Attorney, Agent, or Firm*—Blakely Sokoloff Taylor & Zafman

[57] ABSTRACT

The invention relates to apparatus for identifying and splicing at least one multicore optical fiber and including both a system for displaying each multicore fiber and a fiber splicing system. According to the invention at least one ring for surrounding each multicore fiber to be spliced has an outside envelope that is homothetic (geometrically similar) in shape to the outer envelope of each multicore optical fiber, with the outer outside envelope of each ring being designed to be marked as a function of analysis of the image of each multicore fiber as obtained by means of the display system.

13 Claims, 2 Drawing Sheets

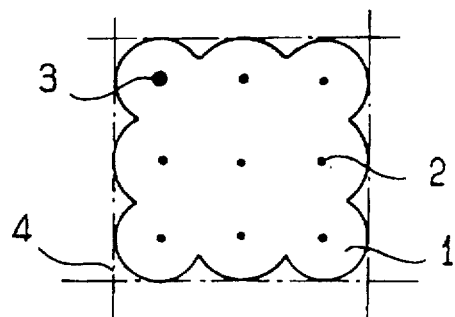
FIG_1
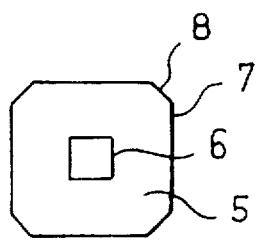
FIG_2
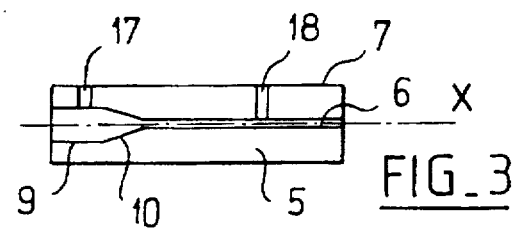
FIG_3
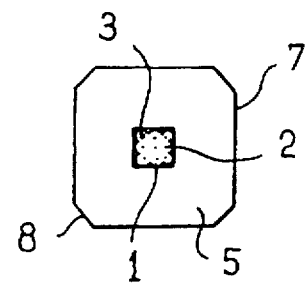
FIG_4
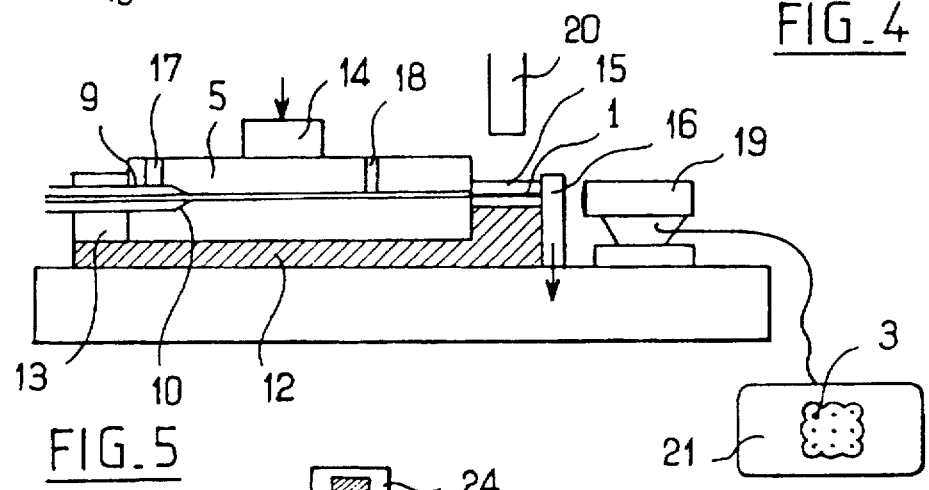
FIG_5
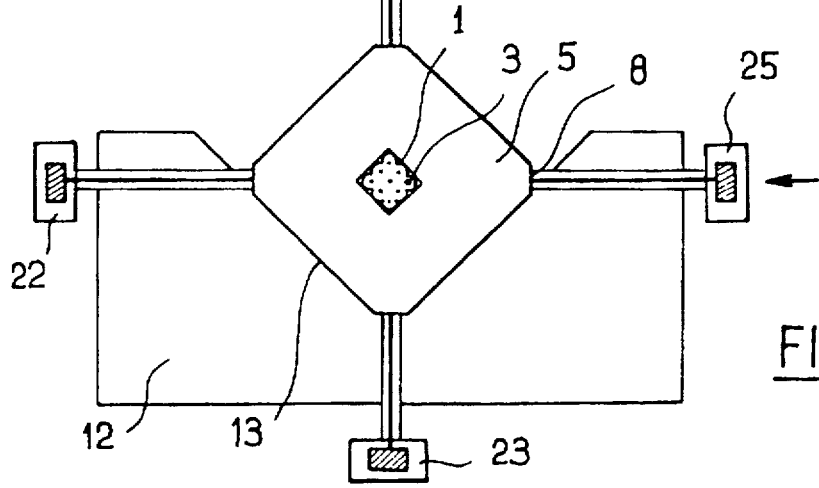
FIG_6

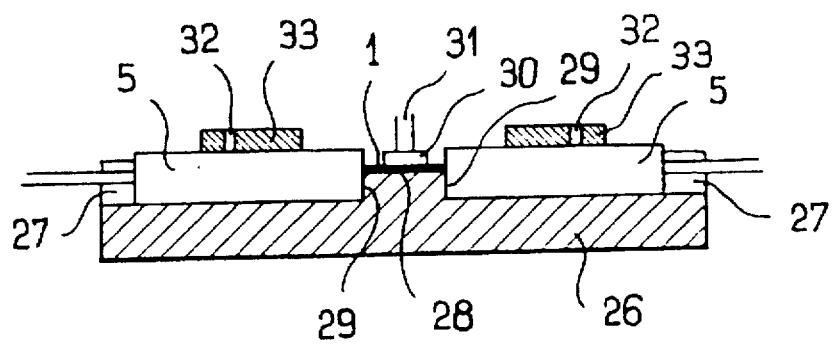
FIG_7
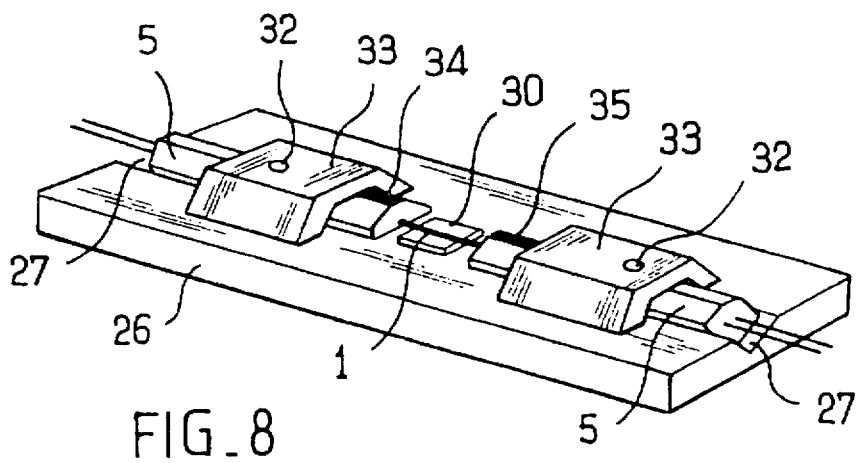
FIG_8
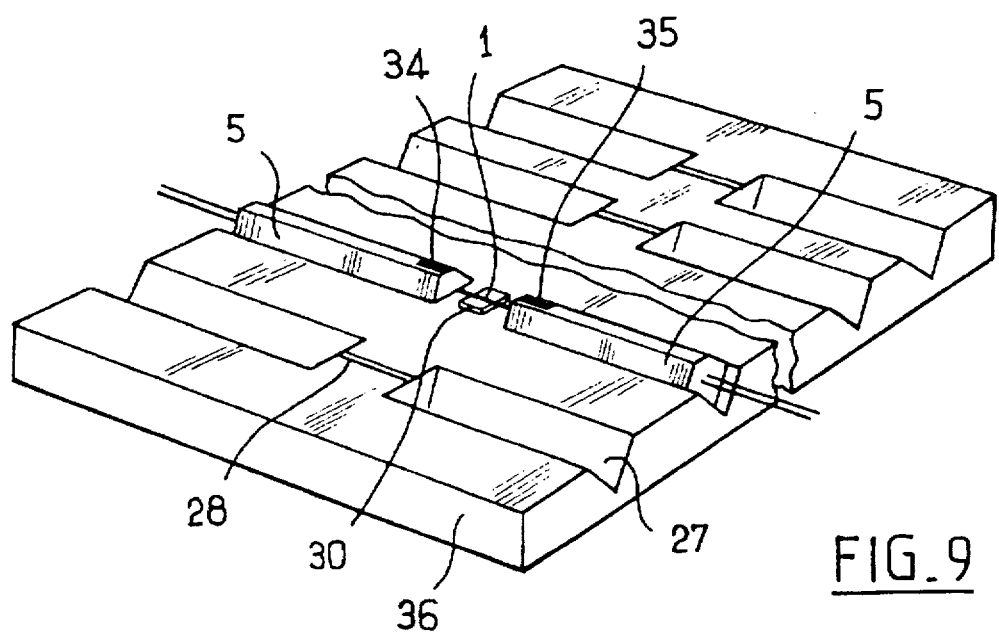
FIG_9

APPARATUS AND A METHOD FOR IDENTIFYING AND SPLICING MULTICORE FIBERS

The present invention relates to apparatus for and to a method of identifying and splicing at least one multicore optical fiber.

More particularly, it relates to apparatus including both a system for displaying each multicore fiber, and a system for splicing fibers.

A particularly advantageous application of the invention lies in splicing multicore monomode fibers, in the factory or on site, while ensuring that each individual waveguide is identified and accurately spliced whether during installation or during a repair.

BACKGROUND OF THE INVENTION

Multicore fiber splicing systems are already known that make use of a reference alignment system such as a V-shaped groove or a ferrule, enabling the fibers which are to be spliced to be put directly into alignment.

Splicing systems are also known that operate by melting multicore fibers.

The major drawback of such splicing systems making use of direct alignment or of melting is that they do not guarantee easy identification of the fiber cores to be aligned, even if it is possible during welding to envisage displaying the cores and rotating the fibers so as to make the cores match.

Such a drawback can severely limit the use of such multicore fibers in an optical fiber distribution network.

Although it is acceptable during network installation to look for waveguides that communicate from one end of a link to the other, with each multicore fiber itself being identified by color coating like a conventional optical fiber, and also by the respective colors of cable assembly elements, the same does not apply when repairing cables or when reorganizing connections, e.g. in distribution or splitting units.

It should be emphasized that during repair, it is essential to reduce the intervention time needed to put the subscriber's link back into operation. If a repair is performed blind, i.e. without fiber identification so as to keep intervention time down, then it is necessary to perform new overall identification of links that have been cut and then repaired, thus giving rise to intervention which is difficult and lengthy, taking place both at the exchange and at the branching points concerned.

Also, document FR 2 701 571 discloses high-accuracy multicore optical waveguides of small size, which waveguides make use of a high-precision matrix. Such a matrix makes it possible, in particular, to facilitate operations of splicing such waveguides. Such multicore fibers may contain N cores, where N lies, for example, in the range 4 to 16.

According to that document, provision is made for the waveguides to be coated in protective coating analogous to the coating of a conventional fiber with the exception that it is provided with identification means, e.g. a sector of a color that is different from the remainder of the coating.

Thus, if the identification means can be implemented merely in the form of a mark in the coating of the fiber, it is possible to envisage distinguishing a particular one of the cores in the multicore matrix. Such distinction can be achieved merely by changing an opto-geometrical characteristic of an individual waveguide, e.g. by having a core diameter that is considerably smaller or considerably greater than the diameter of the other N−1 cores in the waveguide.

Although the use of a core that is significantly different from the others in a four-core fiber can compromise use thereof in high-data rate transmission, thus reducing the potential of such a fiber, in a nine-core fiber, for example, one of the cores can advantageously be identifiable in this manner while simultaneously serving to connect a subscriber to a remote surveillance function.

It should be observed that identification by marking the protective coating of the fiber remains difficult to implement during fiber-drawing, and is in any case difficult to make use of on site, given the small size of the coating and the danger of confusion.

It is also known that with very simple transverse illumination of the optical fiber using white light, it is possible to display the various different cores of the fibers after a short length, either by transverse observation or else by observing the cleaved and polished face of the fiber.

When splicing is being performed on site, it is very important to provide a splicing apparatus that is not subject to any risk of error and that avoids any need for the operator to perform difficult checks or manipulations that would make any identification operation fiddly, dangerous, or uncertain.

OBJECTS AND SUMMARY OF THE INVENTION

Under such conditions, the present invention proposes novel apparatus and a novel method for identifying and splicing that take account of the above-specified constraints and that enable the individual cores of a multicore fiber to be spliced accurately and reliably, while maintaining traceability of the matrices of cores to be spliced, and while minimizing risks and operations that are difficult for an operator to perform.

More particularly, the apparatus of the invention includes at least one ring surrounding each multicore fiber to be spliced and having an outside envelope that is homothetic (geometrically similar) in shape to that of the outer envelope of each multicore optical fiber, the outside envelope of each ring being designed to be marked as a function of analyzing the image of each multicore fiber by means of the display system.

Thus, by means of the apparatus of the invention, the contribution of the operator is reduced merely to the simple, conventional, and usual operations of stripping, cleaving, and inserting the multicore optical fiber into the ring.

All of the other operations of taking account of the identification on the ring, of traceability, and of dimensional verification, can be made automatic, and the splicing operation can be facilitated by manipulating accurately identified rings with fibers of guaranteed longitudinal alignment.

Splicing quality is itself optimized by applying multicore fibers directly in a centering device, thereby avoiding dimensional errors that may have accumulated on any intermediate parts, and giving rise to splicing that is very cheap since no precision parts are required.

According to a characteristic of the identification and splicing apparatus of the invention, each ring includes an inlet duct for the multicore fiber, which duct is circularly cylindrical in shape about an insertion axis X and is extended internally by a funnel-shaped guide duct leading to one end of the central opening, said cylindrical inlet duct having dimensions that are greater than those of the multicore fiber in order to facilitate insertion of the fiber into the ring.

In addition, according to an advantageous characteristic, the identification and splicing apparatus of the invention includes automatic marking equipment suitable for marking each ring as a function of the image of each multicore fiber being analyzed by means of the display system, to identify on each ring at least one reference core of said multicore fiber.

According to a particularly advantageous characteristic, the apparatus of the invention includes a mounting support comprising a deep first V-shaped groove, designed to receive a ring and, in line therewith, a shallow second groove provided at its end with a retractable abutment, said second groove being designed to receive a stripped multicore fiber without special adjustment, inserted through the ring, and brought into abutment against the retractable abutment.

Longitudinal alignment of the multicore fiber, and thus a guarantee that it is properly positioned in the splicing system, is thus ensured by putting the fiber into abutment against the retractable abutment of the mounting support of the apparatus of the invention while the fiber is being inserted into the ring, and by the fiber being prevented from moving therein, e.g. by adhesive.

According to a characteristic of the apparatus of the invention, the mounting support includes a longitudinal abutment for the ring, which abutment is formed by the step situated at the connection between the first groove and the second groove.

In addition, in the apparatus of the invention for identification and splicing, the splicing system comprises at least one deep V-shaped groove designed to receive two rings, each threaded over a multicore fiber to be spliced, said rings being received end-to-end, said deep V-shaped groove including a shallow central portion that is V-shaped and suitable for receiving the stripped multicore fibers to be spliced after they have passed through said rings, said fibers being received directly and without any further manipulation, and being positioned facing one another ready for splicing.

Thus, the longitudinal positioning of the fibers which requires accuracy to within a few microns is ensured, without the drawback of performing sensitive manipulation of the two fibers by putting the rings into abutment, said rings having previously ensured that the fibers are longitudinally positioned in the mounting support of the apparatus of the invention.

With the rings in longitudinal abutment in the splicing system, in particular in the deep grooves of the splicing system, the fibers are automatically positioned longitudinally.

The splicing operation consists merely in applying the multicore fibers in the central groove that is used as the centering groove.

As a result, the quality of the splice is associated essentially with the quality of the multicore matrix and not with the accuracy of the intermediate parts, and overall, the assembly leads to apparatus that is extremely cheap since the N cores are spliced in a single operation that does not require any precision parts.

The method of identifying and splicing at least one multicore optical fiber by means of the identifying and splicing apparatus of the invention comprises the steps consisting in:

positioning a ring in a mounting support in abutment against the step formed at the connection between the first and second V-shaped grooves;

inserting a multicore fiber to be spliced in said ring in such a manner that the stripped multicore fiber emerging from the ring comes into abutment against the retractable abutment of the mounting support;

after the retractable abutment has been retracted, displaying the cleaved front face of the multicore fiber by means of the display system;

as a function of analyzing the image obtained by means of the display system, masking the outside surface of the ring by means of the automatic marking device;

placing the marked ring provided with the multicore fiber to be spliced in the splicing system in such a manner that the stripped multicore fiber emerging from said ring is positioned in the shallow V-shaped central groove;

positioning another multicore fiber inserted in another marked ring to face the multicore fiber that is to be spliced; and sticking together under ultraviolet radiation the two fiber ends that are pressed down against the bottom of the shallow common V-shaped central groove.

The method of the invention takes account of the various ways in which the cores of the multicore fiber can be identified, either by marking the covering, or, which is the most probable case, by one of the cores being different or by the matrix being asymmetrical.

BRIEF DESCRIPTION OF THE DRAWINGS

The following description refers to the accompanying drawings that are given as non-limiting examples, and makes it easy to understand what the invention consists in and how it can be implemented.

In the accompanying drawings:

FIG. 1 is a diagrammatic cross-section view of a multicore fiber having nine cores;

FIG. 2 is a cross-section view of an identifying receiving ring forming a portion of apparatus of the invention;

FIG. 3 is a longitudinal section view of the ring forming a portion of apparatus of the invention;

FIG. 4 is a diagrammatic cross-section view of the FIG. 2 ring, fitted with a multicore fiber;

FIG. 5 is a longitudinal side view of the mounting support of the apparatus of the invention;

FIG. 6 is a cross-section view of the mounting support of apparatus of the invention;

FIG. 7 is a longitudinal section view of the splicing system of apparatus of the invention;

FIG. 8 is a diagrammatic perspective view of the splicing system of FIG. 7; and

FIG. 9 is a diagrammatic perspective view of a variant embodiment of the splicing system of the apparatus of the invention.

MORE DETAILED DESCRIPTION

In FIG. 1, there is shown a cross-section of a multicore optical fiber 1 comprising a matrix of nine individual waveguides or cores 2, with one of the cores, referenced 3, having a diameter that is different from the others, and in this case having a diameter that is greater.

It would naturally be possible to provide for the diameter of the core 3 to be smaller than that of the other cores.

In such a multicore optical fiber 1, it can be assumed that the core 3 that differs from the other cores is more particularly allocated to a system for automatic remote surveillance of subscriber links, being capable of showing the states of such links, of detecting possible degradation at individual waveguide joints, or of immediately establishing which section is faulty or interrupted.

As a result, the light propagation characteristics of such an individual waveguide may be significantly different from those of the other individual waveguides, while nevertheless remaining compatible with the need for isolation between the individual waveguides.

The other eight cores may be directly allocated to subscriber links using various techniques that are already known, e.g. full duplex, or a dedicated link or a combination of both, depending on the expected uses and data rates.

As can be seen in FIG. 1, the multicore fiber 1 is inscribed inside a square 4, with the individual waveguides or cores 2 being accurately referenced within the fiber.

In the typical case as shown, the square 4 has a side of 125 micrometers, for example.

In a multicore fiber 1 that is inscribed in a square of 125 micrometer side, the cores of the fiber are uniformly spaced apart at about 37 micrometers and the method whereby such a fiber is made can guarantee accuracy of much less than 1 micron both with respect to distance between cores and with respect to the dimensions of the square in which the fiber is inscribed, and also with respect to centering of the core matrix within the reference envelope 4.

Advantageously, such a configuration makes it possible to align the fiber cores during splicing by simple alignment in a V-groove, with splicing accuracy then being associated essentially with the accuracy with which the matrix of cores is located within the reference envelope 4 of the optical fiber 1.

In FIG. 1, it will be observed that the core 3 which is different from the other cores is situated in one of the corners of the square 4.

FIG. 2 is a cross-section through a ring 5 forming a portion of apparatus of the invention, said ring 5 being designed to receive the multicore fiber 1 for identification thereof and for splicing to another multicore fiber of the same type.

The outside shape of the ring 5 is a square 7 which is homothetic (geometrically similar) to the square reference envelope 4 of the multicore fiber 1 and which includes a square-shaped central opening 6 of dimensions that are slightly greater than those of the outer envelope 4 of the multicore fiber 1.

By way of example, the dimensions of the square of the central opening 6 in the ring 5 are about (125+10) micrometers so as to enable the multicore fiber to be properly inserted inside the ring 5 while nevertheless performing a precentering function for the splicing operation.

As can be seen in FIG. 2, the ring 5 has flats 8 cut off in all four corners of its outer square envelope 7 so as to facilitate the marking operation, e.g. by inking, to identify the core 3 of the multicore fiber 1.

Advantageously, such a ring may be made by a conventional technique of molding a plastics material that enables a regular square shape to be obtained very cheaply that is reproducible with the desired accuracy.

As can be seen in FIG. 3, the ring 5 has an inlet duct 9 for the multicore fiber 1 which is circularly cylindrical in shape about a longitudinal insertion axis X. This inlet duct 9 is of a diameter that is greater than the dimensions of the central opening 6 of the ring 5 so as to facilitate insertion of the fiber into the ring along the axis X. This inlet duct 9 is extended internally by a guide duct in the form of a funnel 10 which leads to one end of the central opening 6.

In addition, transverse ducts 17 and 18 are provided in the ring 5 opening out from the outside into the cylindrical inlet duct 9 and into the central opening 6 so as to enable adhesive to be injected into the ring to hold the multicore fiber inserted into the central opening 6 of the ring.

As can be seen more particularly in FIG. 4, when the multicore fiber 1 is threaded inside the ring 5, the core 3 which is different from the other cores 2 is in a position corresponding to a corner of the outer square 7 and thus to one of the cut-off flats 8 of the ring 5. The core 3 can therefore take up four different positions.

The mark to be made on the cut-off flat corresponding to the position of the core 3 in the multicore fiber will be used for identification purposes when splicing the fiber to another fiber of the same type.

As shown in FIG. 5, the ring 5 is disposed on a mounting support 12. This mounting support 12 is provided with a deep first V-shaped groove 13 that is designed to support the ring 5.

This deep first V-shaped groove 13 is extended longitudinally from one of its ends by a shallow second V-shaped groove 15 suitable for receiving the bare multicore fiber 1 inserted into the ring 5 and emerging therefrom, and suitable for receiving it without any special adjustment.

At the end of this shallow second V-groove 15, there is provided a retractable abutment 16.

When the stripped multicore fiber 1 is inserted through the ring 5, it takes up a position in the shallow second groove 15 and comes into abutment against the retractable abutment 16 positioned at an outlet position.

The step between the deep first groove 13 and the shallow second groove 15 provides a longitudinal abutment for the ring 5.

A presser system 14 is also provided to press the ring 5 into the deep first groove 13.

In a manner that is very simple and cheap, such a support 12 ensures that the ring 5 and the multicore fiber 1 are properly positioned longitudinally.

After the multicore fiber has been put into abutment within the ring, the multicore fiber is stuck to the inside of the ring using the adhesive feed channels 17 and 18, after which the retractable abutment is retracted so as to make it possible to perform identification on the multicore fiber.

The display system of the apparatus of the invention serves to display the cleaved face of the multicore fiber 1.

It comprises a camera 19 provided with an optical system that is positioned behind the retractable abutment 16 facing the cleaved face of the multicore fiber 1 positioned in the groove 15 of the mounting support 12. The camera 19 is suitable for observing the front face of the fiber, and in particular for providing an image of the matrix of cores which are illuminated by means of a light source 20 adapted to such an application.

Such a camera display system is also known in apparatuses made for splicing together conventional monomode optical fibers by welding.

The image of the matrix of cores in the fiber 1 maybe displayed on a screen 21 connected to the camera 19 so as to enable the operator to inspect visually the fiber that is to be spliced.

At this point it is possible for the operator to observe on the screen 21 any major defect in the fiber, e.g. in the cleaving of the front face of the fiber, in which case the operator may suspend the splicing operation.

If the fiber is badly cleaved, the very small cost of the ring 5 makes it possible to eliminate said part and start splicing again from the beginning.

The image may be analyzed by means of appropriate software serving to provide information concerning the accuracy of the multicore matrix, whether with respect to the outside shape of the fiber or with respect to the disposition of the cores within the matrix.

Such information can be most advantageous for a splice of this type, either for giving unambiguous information about the mean level of losses obtained during splicing, or else for maintaining traceability of splices performed in a distribution zone.

As shown in FIG. 6, an automatic marking device 22, 23, 24, and 25 is provided on the mounting support 12 for the purpose of marking the outer envelope 7 of each ring 5 as a function of the analysis performed on the image of each multicore fiber using the screen 21 and a display system.

The marking device serves to identify on the ring 5 at least one reference core 3 in the multicore fiber 1.

More particularly, in this case the marking device comprises a plurality of automatic individual inking devices 22, 23, 24, and 25 located around each ring 5 positioned in a deep groove 13 and facing the cut-off flats 8 of the outer envelope 7 of the ring so as to enable them to ink the cut-off flats of the ring 5 individually by means of an ink jet. Each automatic inking device is triggered as a function of the analysis of the image obtained on the screen 21.

In a variant, it is also possible to provide for a single individual marker device that is suitable for being mounted so as to be rotatable relative to the mounting support 12 about the ring 5, and for it to be positioned in an appropriate marking position facing one of the cut-off corners of the ring 5 in application of an order given in response to the analysis of the image that is obtained of the multicore fiber as displayed on the screen 21.

Naturally, it is possible in a variant embodiment to provide for marking by stamping, for the date and the time of splicing to be marked, or for the ring to be identified by any identification device other than inking.

Thus, the automatic marking device is used to mark the cut-off flat that corresponds to the position of the core 3 of the multicore fiber.

Once the ring 5 has been marked, it is ready for use in splicing to a corresponding multicore fiber itself positioned in another marked ring 5 of the same type.

FIGS. 7 and 8 show more particularly how two multicore fibers are spliced together after initially being positioned in rings 5 and marked.

The splicing system of the identification and splicing apparatus of the invention comprises a support 26 in which a deep V-shaped groove 27 is provided for receiving the rings 5 end-to-end and provided in a central portion with a shallow V-shaped groove 28 suitable for receiving that stripped multicore fibers 1 that are to be spliced together where they emerge from the rings 5.

It should be specified that the rings 5 are positioned in the groove 27 with their respective marks 34 and 35 placed at the top of the splicing system so as to be visible after splicing.

The step between the deep V-groove 27 and the shallow central V-groove 28 serves to ensure longitudinal alignment of the rings 5 which come into abutment against said step.

Abutment takes place at the junction 29 between the grooves of two different depths, and as a result the stripped fibers 1 emerging from the rings 5 naturally come into face to face relative positioning without further handling and with a distance between the two faces that are to be spliced together that may be of the order of a few microns, thereby ensuring that transmission losses are very low and due solely to said parameter of spacing between the faces.

The accuracy of such mounting is thus essentially associated with the accuracy of the length of the central groove 28 that receives the fiber and the accuracy with which the fibers 1 are brought into abutment in the mounting support 12.

The centering device associated with the splicing device 26 comprises a simple pressure-applying system that may advantageously be constituted, for example, by a transparent plate 30 of glass or plastics material which is pressed by a tool 31 and which enables the two ends of the fibers 1 pressed down against the bottom of the common central V-groove 28 to be stuck together under the influence of UV radiation.

In addition, the rings 5 may be stuck by means of holes 32 formed in the top portion 33 of the splicing support 26, or they may be snapped into place using a well-known technique.

An operation which is always rather difficult to perform on site is thus achieved with a minimum amount of manipulation, and in particular without any sensitive putting into abutment of the two fibers during splicing thereof, and the resulting splice is very cheap and highly reliable while nevertheless, as shown in FIG. 8 which is a diagrammatic perspective of the resulting joint, guaranteeing accurate and visible marking of the cores of a multicore fiber, with the markings 34 and 35 always being used on the top portions of the mounting support 26, i.e. the portion which is visible after splicing has taken place.

FIG. 9 shows a variant of the splicing system of the identification and splicing apparatus of the invention, in which a mounting support 36 has a plurality of deep positioning grooves 27 disposed in parallel and each coinciding in its central portion with a respective shallow adjustment groove 28. Such a mounting support 36 makes it possible to splice fibers at high density in the form of strips.

The apparatus and the method of the present invention make it simple and cheap to transfer the intrinsic identification means in a multicore optical fiber to an outer ring in a manner that is highly visible.

They also show the advantage of using, for the multicore fiber, a matrix whose square shape, for example, enables the two matrices that are to be spliced together to be centered in a device that is very cheap.

These apparatuses and methods avoid the drawback of it being difficult to identify the individual waveguides in a multicore fiber during splicing, whether splicing is performed in an installation or during repairs, by the technique of transferring the identification onto the ring.

Such apparatuses and methods are cheap since none of the parts implemented requires very great precision, whether the parts are located in the mounting support or in the splicing system, thus making it possible to use parts that are made of plastics material or of ceramics material or indeed of glass, using techniques that are very cheap, such as molding.

Compared with the unit cost of splicing a monomode waveguide, the method of the invention thus demonstrates, the enormous potential of multicore fibers since it serves to splice together a plurality of cores, including a core for operations of remote surveillance or of remote maintenance, in the same amount of time as is required for splicing together a conventional single core fiber, while guaranteeing that the individual waveguides within the matrix are properly identified and while ensuring that the splices performed are traceable, and without requiring precision parts to be used.

The quality of the splicing is therefore associated essentially with the intrinsic quality of the multicore matrix of the fiber which is a requirement inherent to this concept based on obtaining, machining, and assembling and drawing down high precision preforms.

The invention is not limited in any way to the embodiment described and shown, and the person skilled in the art can make any variation that comes within the spirit of the invention.

We claim:

1. Identifying and splicing apparatus for identifying and splicing at least one multicore optical fiber, the apparatus including both a display system for each multicore fiber and a fiber splicing system, the apparatus further including at least one ring surrounding each multicore fiber to be spliced and having an outside envelope that is homothetic (geometrically similar) in shape to that of the outer envelope of each multicore optical fiber, the outside envelope of each ring being designed to be marked as a function of analyzing the image of each multicore fiber by means of the display system.

2. Identifying and splicing apparatus according to claim 1, wherein each ring includes a central opening suitable for receiving a multicore fiber, said central opening being of shape and dimensions that correspond to the outside shape and dimensions of the multicore fiber with a certain amount of clearance to facilitate insertion with precentering of the multicore fiber in the ring.

3. Identifying and splicing apparatus according to claim 2, wherein each ring includes an inlet duct for the multicore fiber, which duct is circularly cylindrical in shape about an insertion axis X and is extended internally by a funnel-shaped guide duct leading to one end of the central opening, said cylindrical inlet duct having dimensions that are greater than those of the multicore fiber in order to facilitate insertion of the fiber into the ring.

4. Identifying and splicing apparatus according to claim 1, wherein each ring is square in outside shape, having four corners with cut-off flats suitable for being marked.

5. Identifying and splicing apparatus according to claim 1, including automatic marking equipment suitable for marking each ring as a function of the image of each multicore fiber being analyzed by means of the display system, to identify on each ring at least one reference core of said multicore fiber.

6. Identifying and splicing apparatus according to claim 5, wherein the automatic marking equipment includes a plurality of individual automatic marking devices suitable for being positioned around said ring and for being triggered individually as a function of the image analysis.

7. Identifying and splicing apparatus according to claim 5, wherein the automatic marking equipment includes a single individual marking device suitable for being mounted to rotate about a ring and to take up a determined marking position in response to an order issued in response to analysis of the image of the multicore fiber.

8. Identifying and splicing apparatus according to claim 1, including a mounting support comprising a deep first V-shaped groove designed to receive a ring and, in line therewith, a shallow second groove provided at its end with a retractable abutment, said second groove being designed to receive a stripped multicore fiber without special adjustment, inserted through the ring, and brought into abutment against the retractable abutment.

9. Identifying and splicing apparatus according to claim 8, wherein the mounting support includes a longitudinal abutment for the ring, which abutment is formed by the step situated at the connection between the first groove and the second groove.

10. Identifying and splicing apparatus according to claim 8, wherein a presser system is provided on the mounting support to press the ring into the deep first V-shaped groove, and wherein the display system is placed behind the retractable abutment of said mounting support, facing the end of the second groove.

11. Identifying and splicing apparatus according to claim 1, wherein the splicing system comprises at least one deep V-shaped groove designed to receive two rings, each threaded over a multicore fiber to be spliced, said rings being received end-to-end, said deep V-shaped groove including a shallow central portion that is V-shaped and suitable for receiving the stripped multicore fibers to be spliced after they have passed through said rings, said fibers being received directly and without any further manipulation, and being positioned facing one another ready for splicing.

12. Identifying and splicing apparatus according to claim 11, wherein the splicing system includes a plurality of parallel deep V-shaped grooves for receiving a plurality of rings each having a central portion constituted by a shallower V-shaped groove for supporting the stripped multicore fibers.

13. A method of identifying and splicing at least one multicore optical fiber using identifying and splicing apparatus according to claim 1, the method consisting in the steps consisting in:

positioning a ring in a mounting support in abutment against the step formed at the connection between the first and second v-shaped grooves;

inserting a multicore fiber to be spliced in said ring in such a manner that the stripped multicore fiber emerging from the ring comes into abutment against the retractable abutment of the mounting support;

after the retractable abutment has been retracted, displaying the cleaved front face of the multicore fiber by means of the display system;

as a function of analyzing the image obtained by means of the display system, marking the outside surface of the ring by means of the automatic marking device;

placing the marked ring provided with the multicore fiber to be spliced in the splicing system in such a manner that the stripped multicore fiber emerging from said ring is positioned in the shallow V-shaped central groove;

positioning another multicore fiber inserted in another marked ring to face the multicore fiber that is to be spliced; and sticking together under ultraviolet radiation the two fiber ends that are pressed down against the bottom of the shallow common V-shaped central groove.

* * * * *